US009763025B2

(12) United States Patent
Tarleton et al.

(10) Patent No.: US 9,763,025 B2
(45) Date of Patent: Sep. 12, 2017

(54) RADIUS ACCOUNTING FEED DISTRIBUTION AND ACTIVE ON-NETWORK DETERMINATION

(71) Applicant: Numerex Corp., Atlanta, GA (US)

(72) Inventors: Bryan Tarleton, Buford, GA (US); Michael J. Criscolo, Sandy Springs, GA (US); Wayne Stargardt, Smyrna, GA (US)

(73) Assignee: Numerex Corp., Atlanta, GA (US)

( * ) Notice: Subject to any disclaimer, the term of this patent is extended or adjusted under 35 U.S.C. 154(b) by 0 days.

(21) Appl. No.: 14/862,701

(22) Filed: Sep. 23, 2015

(65) Prior Publication Data

US 2016/0014542 A1   Jan. 14, 2016

Related U.S. Application Data

(63) Continuation-in-part of application No. 14/272,709, filed on May 8, 2014.

(60) Provisional application No. 61/929,643, filed on Jan. 21, 2014.

(51) Int. Cl.
| | |
|---|---|
| *H04W 4/00* | (2009.01) |
| *H04W 4/14* | (2009.01) |
| *H04W 8/10* | (2009.01) |
| H04W 88/16 | (2009.01) |
| H04W 4/12 | (2009.01) |
| H04W 88/18 | (2009.01) |

(52) U.S. Cl.
CPC ............ *H04W 4/003* (2013.01); *H04W 4/14* (2013.01); *H04W 8/10* (2013.01); *H04W 4/12* (2013.01); *H04W 88/16* (2013.01); *H04W 88/184* (2013.01)

(58) Field of Classification Search
CPC ....... H04W 4/14; H04W 4/12; H04W 88/184; H04L 51/38; H04L 67/24; H04L 12/5895; H04L 69/329
See application file for complete search history.

(56) References Cited

U.S. PATENT DOCUMENTS

| | | | | | |
|---|---|---|---|---|---|
| 5,941,829 | A | * | 8/1999 | Saltzstein | ............ A61B 5/0006 128/904 |
| 2004/0038688 | A1 | * | 2/2004 | Zabawshyj | ............. H04W 8/08 455/456.3 |
| 2009/0163181 | A1 | * | 6/2009 | Ung | ........................ H04W 4/02 455/412.2 |
| 2011/0230212 | A1 | | 9/2011 | Cai | |

(Continued)

OTHER PUBLICATIONS

3GPP TS 23.002 V10.0.0. pp. 1-95. Sep. 2010.*

(Continued)

*Primary Examiner* — Vladimir Magloire
*Assistant Examiner* — Ernest Tacsik
(74) *Attorney, Agent, or Firm* — King & Spalding LLP

(57) ABSTRACT

An application interface can support real-time RADIUS accounting notification. The application interface can have integrated RADIUS server accounting A RADIUS server can contain data session accounting messages, for example session start. A real-time feed can be received from the RADIUS server. RADIUS accounting messages received via the feed can be translated into application notification messages. The translated application notification messages can be delivered to registered applications that may reside on an external customer network.

23 Claims, 6 Drawing Sheets

(56) References Cited

U.S. PATENT DOCUMENTS

2011/0264747 A1* 10/2011 Mutikainen ........... H04L 12/581
    709/206
2012/0258743 A1* 10/2012 Kurokawa .......... H04L 12/6418
    455/466
2012/0282891 A1* 11/2012 Mohammed ........ H04L 63/0428
    455/406

OTHER PUBLICATIONS

European Search Report for European Patent Application EP 15151837.0, issued Jun. 2, 2015.
"3$^{rd}$ Generation Partnership Project; technical Specification Group Services and System Aspects; Support of Short Message Services (SMS) over generic 3GPP Internet Protocol (IP) access; Stage 2 (Release 12)", 3GPP Draft; 23204-C40_CR_Implemented, Dec. 16, 2013.

* cited by examiner

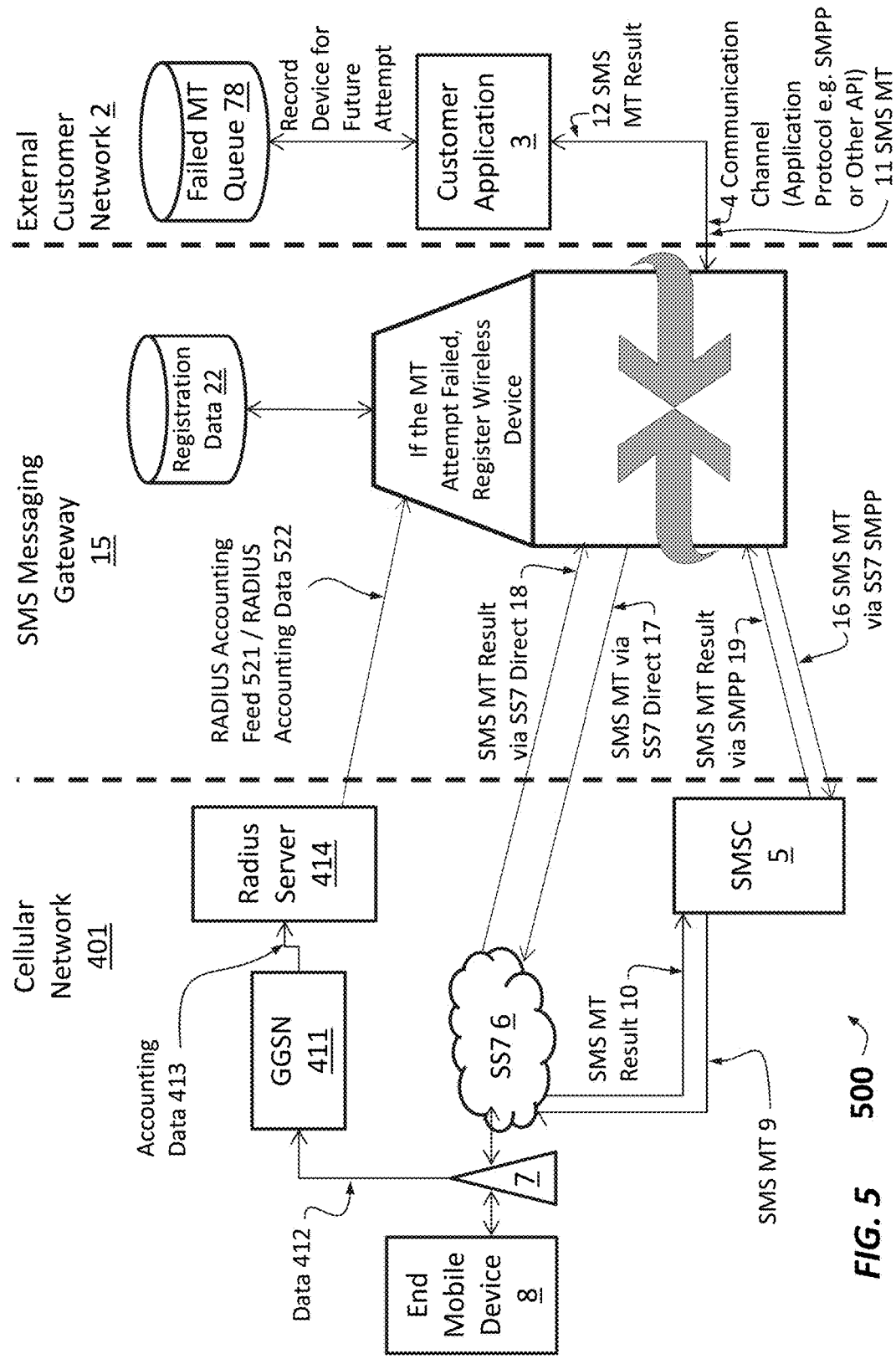
FIG. 5    500

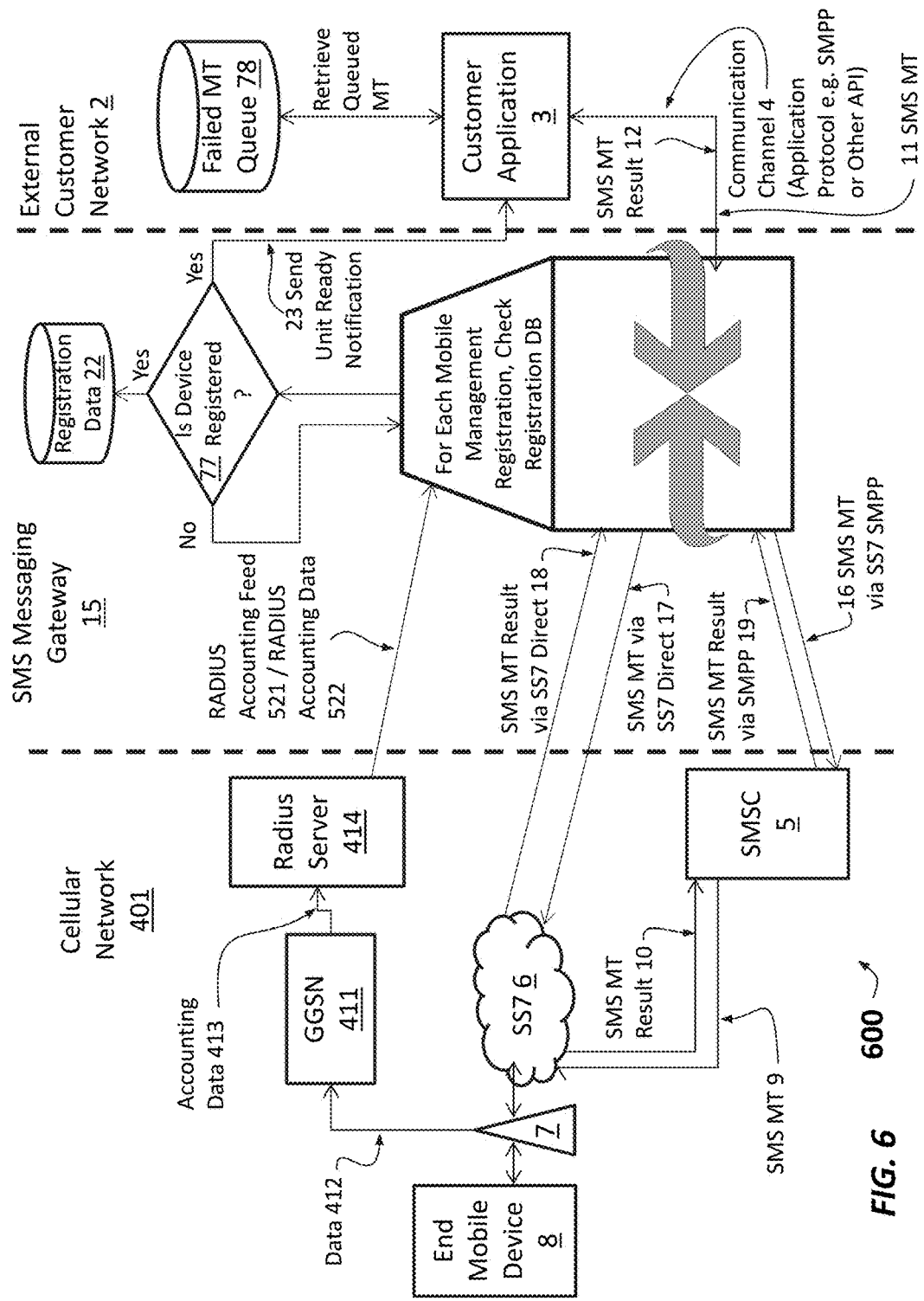
FIG. 6    600

RADIUS ACCOUNTING FEED DISTRIBUTION AND ACTIVE ON-NETWORK DETERMINATION

CROSS REFERENCE TO RELATED APPLICATIONS

This application is a continuation-in-part of and claims priority to U.S. patent application Ser. No. 14/272,709 filed May 8, 2014, designating co-inventors Bryan Tarleton, Michael J. Criscolo, and Wayne Stargardt and entitled "Mobile Management Message Distribution and Active On-Network Determination;" which claims priority to U.S. Provisional Patent Application No. 61/929,643 filed Jan. 21, 2014, designating co-inventors Bryan Tarleton, Michael Criscolo, and Wayne Stargardt and entitled "Method for Real Time Mobile Management Message Distribution and Active On-Network Determination." The entire contents of each of the above identified priority documents and specifically U.S. patent application Ser. No. 14/272,709 and U.S. Provisional Patent Application No. 61/929,643 are hereby incorporated herein by reference.

TECHNICAL FIELD

The present technology relates generally to communication signaling, and more specifically to a system and method for RADIUS accounting feed distribution and active on-network determination.

BACKGROUND

Cellular network technology provides an efficient way to communicate with mobile devices. For example, one mobile device moving within a system of cellular networks may communicate with other fixed and mobile devices.

Need arises for remote customer applications to interact with the mobile device. For example, a customer application residing on a network other than the cellular network, for example a customer network, may seek to interact with the mobile device. The customer application might comprise a security application, a vehicle tracking application, or a supply chain management application, to mention a few representative examples without limitation. To facilitate or setup interaction between the customer application and the mobile device, need exists to provide the customer application with information about the mobile device, for example the availability of the device. Need further exists for a capability to provide the remote customer application with access to signaling information about the mobile device.

A technology filling this need, or some related deficiency in the art, would improve communications. For example, such a capability could support or enable a host of services that depend upon knowledge of the real-time status of subscribed mobile devices.

SUMMARY

A gateway can provide an interface between a cellular network and an external customer network on which a customer application resides. A feed from the cellular network to the gateway can provide information relevant to determining whether a mobile device on the network is available. The feed may connect to a RADIUS server or to a home location register (HLR) database associated with the cellular network, for example. Based on information transmitted over the feed, the gateway can notify the customer application about availability of the mobile device.

The foregoing discussion is for illustrative purposes only. Various aspects of the present technology may be more clearly understood and appreciated from a review of the following text and by reference to the associated drawings and the claims that follow. Other aspects, systems, methods, features, advantages, and objects of the present technology will become apparent to one with skill in the art upon examination of the following drawings and text. It is intended that all such aspects, systems, methods, features, advantages, and objects are to be included within this description and covered by this application and by the appended claims of the application.

BRIEF DESCRIPTION OF THE FIGURES

Reference will be made below to the accompanying drawings.

FIG. 5 illustrates a functional block diagram of another system providing another exemplary operating environment for some embodiments of the invention, wherein a digital gateway is located between a cellular network that comprises a RADIUS server and external applications.

FIG. 6 illustrates a functional block diagram of another system in which the system illustrated in FIG. 5 has been enhanced to provide signaling messages for use by applications on an external customer network in accordance with exemplary embodiments of the invention.

Figure 1:
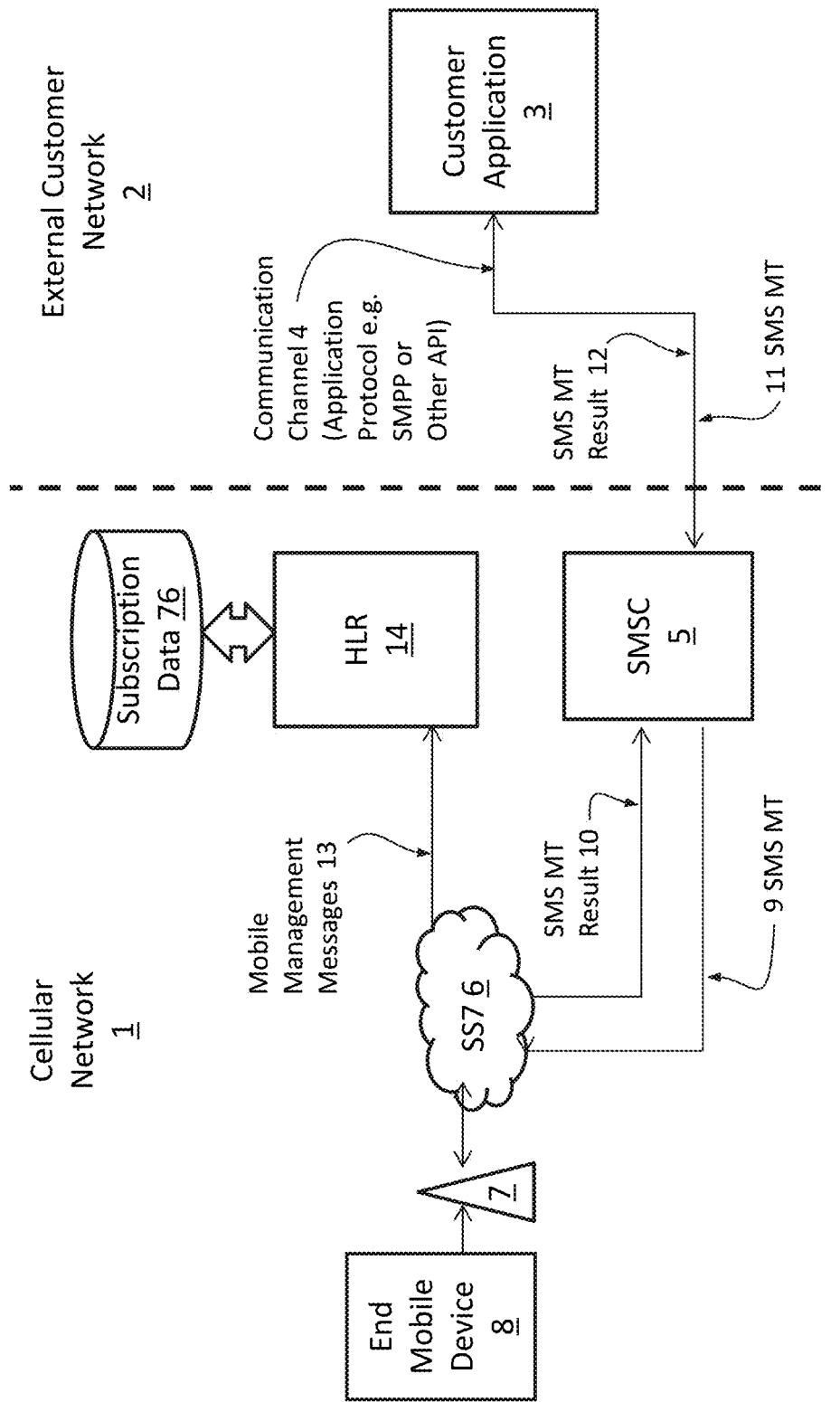
FIG. 1 illustrates a functional block diagram of a system providing an exemplary operating environment for an embodiment of the invention, with control messages and SMS messages flowing through mobile networks in accordance with international standards.

The drawings illustrate only example embodiments and are therefore not to be considered limiting of the embodiments described, as other equally effective embodiments are within the scope and spirit of this disclosure. The elements and features shown in the drawings are not necessarily drawn to scale, emphasis instead being placed upon clearly illustrating principles of the embodiments. Additionally, certain dimensions or positionings may be exaggerated to help visually convey certain principles. In the drawings, similar reference numerals among different figures designate like or corresponding, but not necessarily identical, elements.

DETAILED DESCRIPTION OF EXAMPLE EMBODIMENTS

Representative embodiments of the technology will be described more fully hereinafter with example reference to the accompanying drawings. The technology may, however, be embodied in many different forms and should not be construed as limited to the embodiments set forth herein; rather, these embodiments are provided so that this disclosure will be thorough and complete, and will fully convey the scope of the technology to those appropriately skilled in the art.

Figure 2:
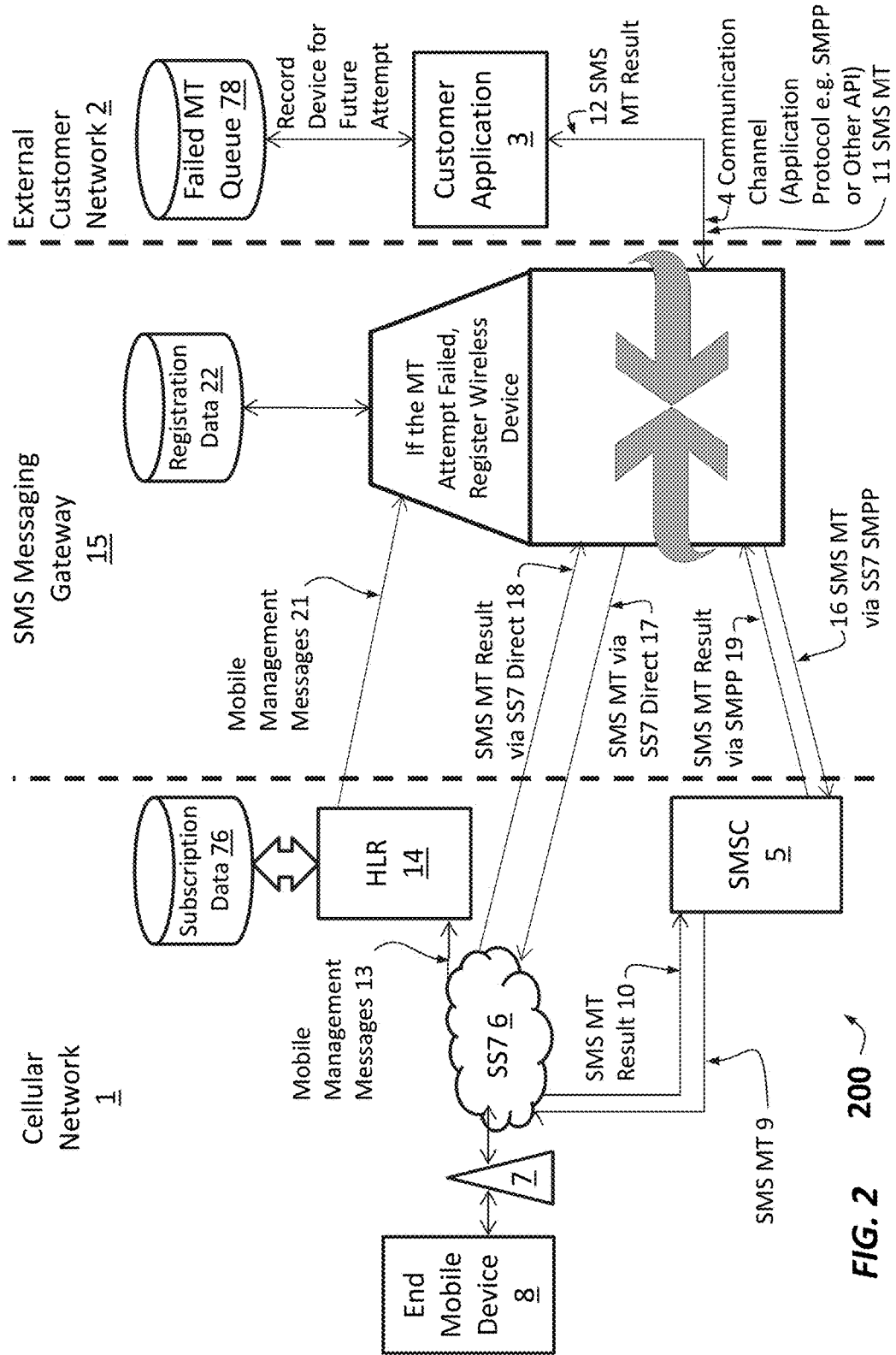
FIG. 2 illustrates a functional block diagram of another system providing another exemplary operating environment for an embodiment of the invention, wherein a digital gateway is located between a cellular network and external applications.
Figure 3:
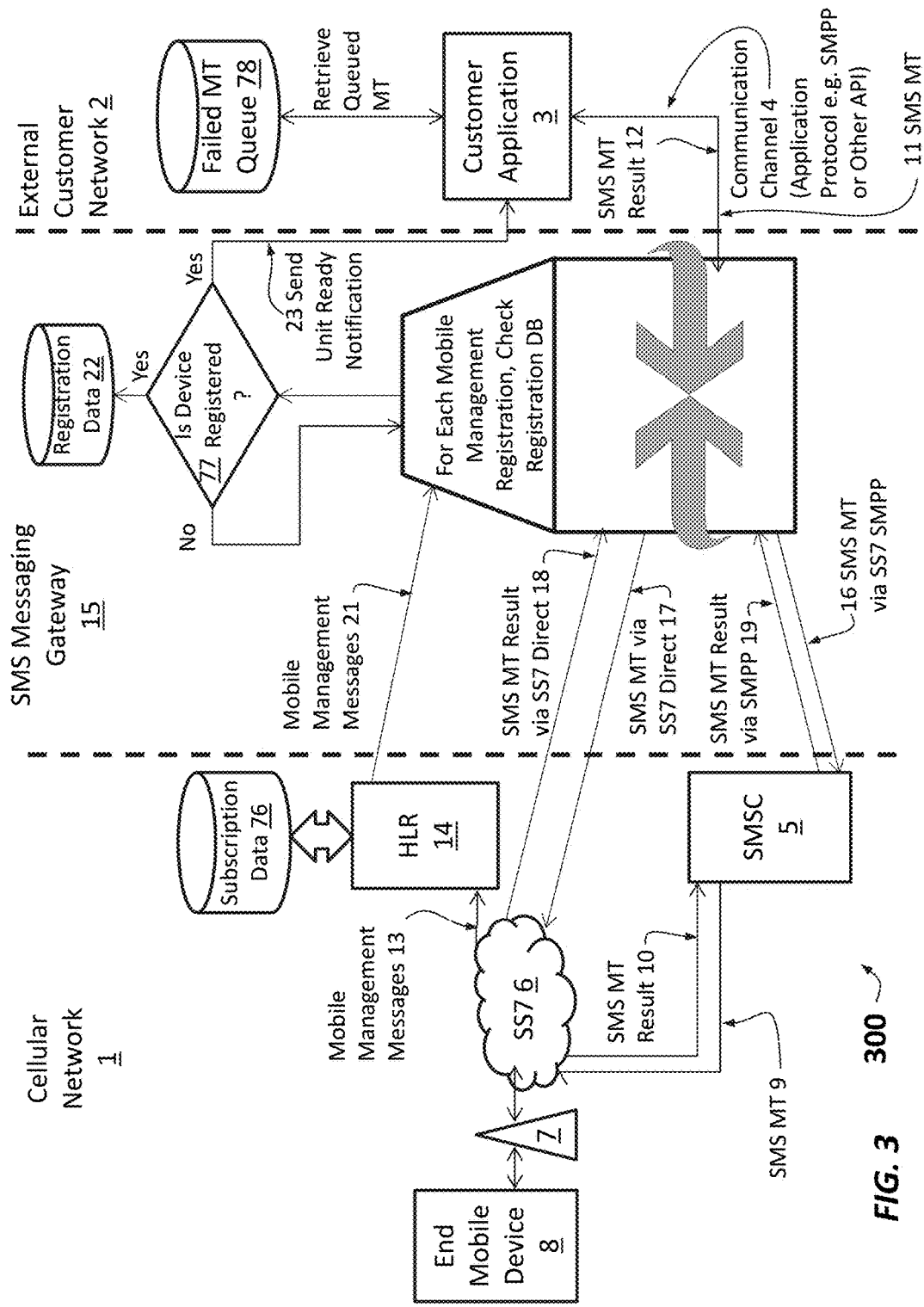
FIG. 3 illustrates a functional block diagram of another system in which the system illustrated in FIG. 2 has been enhanced to provide SS7 mobile management signaling messages for use by applications on an external customer network in accordance with exemplary embodiments of the invention.
Figure 4:
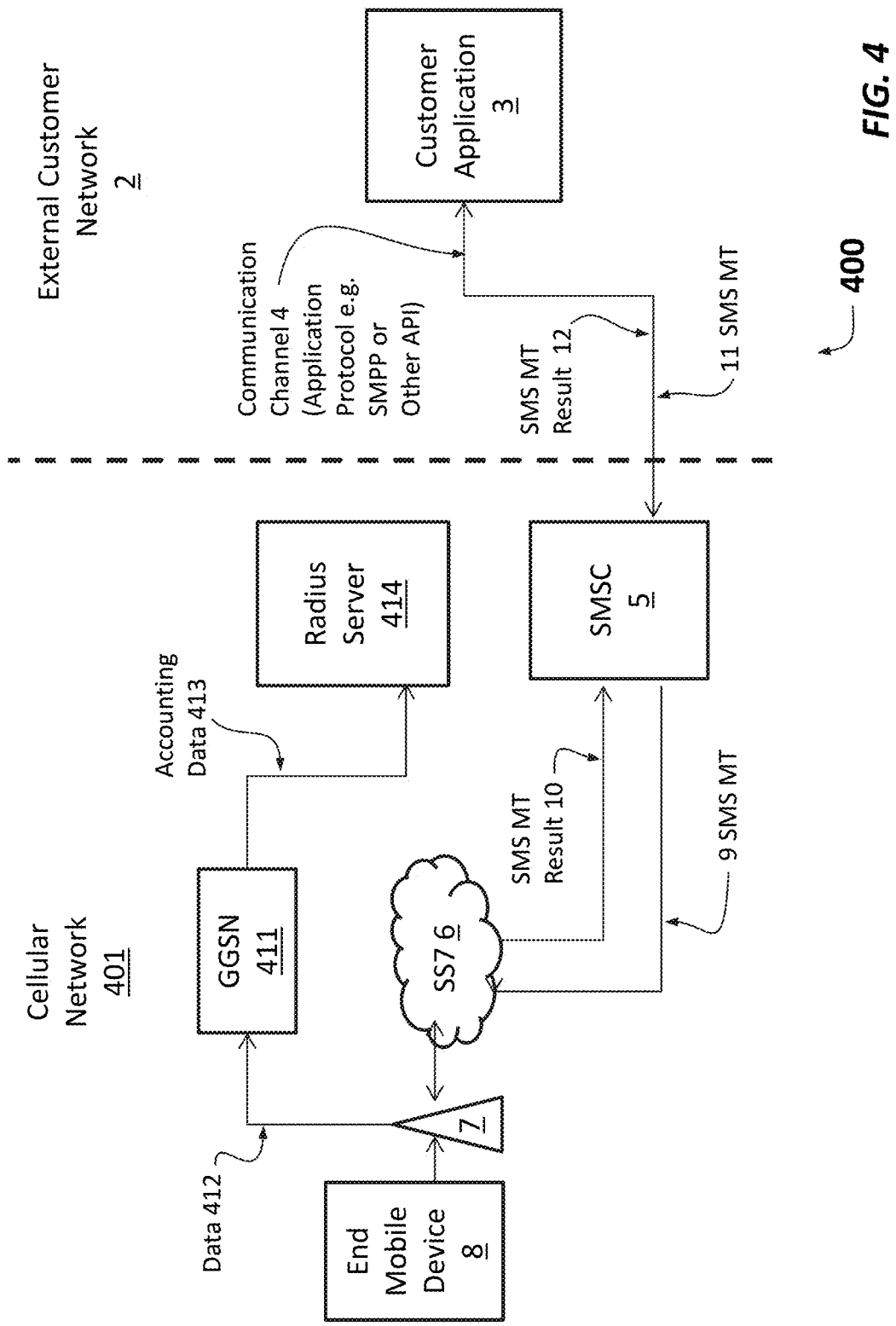
FIG. 4 illustrates a functional block diagram of a system providing an exemplary operating environment for some embodiments of the invention, wherein a cellular network comprises a RADIUS server.

As discussed in further detail below, a feed from a cellular network can provide a gateway with information relevant to making a determination about whether a mobile device on the network is available. If the gateway determines that the mobile device is available, the gateway can notify a customer application of the device's availability. The feed may connect to an HLR, a RADIUS server, or some other appropriate system associated with the cellular network, for example. FIGS. 1, 2, and 3 illustrate an embodiment that utilizes an HLR, while FIGS. 4, 5, and 6 illustrate an embodiment that utilizes a RADIUS server. Some representative embodiments will first be discussed below with example reference to FIGS. 1, 2, and 3, and then some representative embodiments will be discussed with example reference to FIGS. 4, 5, and 6.

Turning now to FIG. 1, this figure illustrates a functional block diagram of a system 100 providing an example operating environment for an embodiment of the technology, with control messages and SMS messages flowing through a cellular network 1 in accordance with international standards. The system 100 comprises an external customer network 2 that supports customer applications 3 and that is linked to the cellular network 1. In an example embodiment, the cellular network 1 can comprise a telecommunications carrier network and/or a mobile network.

The external customer network 2 provides a communication path at or to facilities of a customer. The external customer network 2 may comprise a proprietary network belonging to a customer, for example. More generally, the illustrated external customer network 2 can represent a facility or facilities that house one or more customer applications 3 and/or one or more associated communication paths.

The customer application 3 may comprise a security application, a vehicle tracking application, or a supply chain management application, to mention a few representative examples without limitation. The customer application 3 may comprise an application that would need or benefit from a capability to send one or more command and control messages to one or more end mobile devices 8, for example. Such a message might comprise an alarm acknowledgement or a location request, for example.

In operation, the customer application 3 in the customer network 2 submits a Short Message Service (SMS) Mobile Terminate message (SMS MT) 11 to the SMSC 5 within the cellular network 1 via a communications channel 4. While the cellular network 1 is illustrated by example, other types of telecommunications networks that may utilize SS7 signaling are supported by the present technology. Standard Short Message Peer-to-Peer (SMPP) protocol may be utilized, for example. The SMSC 5 submits the received SMS MT message 9 to the serving SS7 network 6 over interconnecting SS7 communications links. The serving SS7 network 6 attempts to deliver the message to the end mobile device 8 via a wireless telecommunications system 7. The SMS MT result 10 from the wireless telecommunications system 7 is delivered to the SMSC 5 over interconnecting SS7 communications links. The SMSC 5 sends the SMS MT result 12 of the SMS MT attempt 11 to the customer application 3. Mobile management messages 13 are constantly streamed to the serving HLR 14, independent of any other activity, to register presence and location and to authenticate mobile devices 8. The HLR 14 has an associated subscription database 76. The mobile management messages 13 (e.g. messaging) can be integral with the cellular network 1, without interfacing with applications outside the wireless telecommunications system 7 and associated SS7 network elements. As will be discussed in further detail below, the system 100 can be upgraded to support enhanced signaling with the customer application 3.

Turning now to FIG. 2, this figure illustrates a functional block diagram of another system 200 providing another example operating environment for an embodiment of the technology, wherein an example digital gateway, specifically a computer-based SMS Messaging Gateway 15, is located between a cellular network 1 and an external customer network 2 that comprises a customer application 3.

SMS message flow and/or device registration on the system 200 can comprise one or more aspects of the disclosure or teaching provided in U.S. patent application Ser. No. 13/848,804, entitled "Method and System for Efficiently Routing Messages," to Bryan Keith Tarleton, Michael J. Criscolo, Edward I. Comer, and William George Simitses. The entire contents of U.S. patent application Ser. No. 13/848,804 are hereby incorporated herein by reference.

In operation, the customer application 3 in the customer network 2 submits an SMS Mobile Terminate message 11 to the SMS messaging gateway 15 via the communications channel 4, typically using standard SMPP protocol. The SMS messaging gateway 15 submits the MT message 16 to the SMSC 5 in the cellular network 1, typically using standard SMPP protocol. The SMS messaging gateway 15 submits the MT message 17 directly to the wireless telecommunications system 7 using the SS7 network 6. The cellular network 1 submits the MT message 17 to the wireless telecommunications system 7 using the SS7 network communications links. The wireless telecommunications system 7 attempts to deliver the MT message 17 to the mobile device 8. An MT result message 10 from the wireless telecommunications system 7 is delivered to the SMSC 5. An MT result message 18 is delivered to the SMS messaging gateway 15 via SS7 communications links. An MT result message 19 is delivered to the SMS messaging gateway 15 from the SMSC 5. The result of the MT result message 12 is sent to the customer application 3 in the external customer network 2. A failed MT queue 78 records devices for future attempts.

Turning now to FIG. 3, this figure illustrates a functional block diagram of an example system 300 in which the system 200 illustrated in FIG. 2 has been enhanced to provide real-time SS7 mobile management signaling messages for use by customer applications 3 on the external customer network 2 in accordance with some embodiments of the technology. The system 300 illustrated in FIG. 3 can be viewed as overlaying an improved signaling technology or process upon the system 200 illustrated in FIG. 2 and upon the associated processes discussed above.

With real-time mobile management signaling messages, the signaling messages are delivered to the customer application 3 immediately upon receipt from the HLR 14, that is, within approximately one second. If the customer application 3 responds within a few seconds of receipt of the unit ready message by sending an MT message to the mobile device 8 represented by the registration, the likelihood of successful transmission of the MT to the device 8 is high, such as about 90%. In comparison, MT messages sent randomly, without the unit ready notification, typically experience a far lower success ratio, such as about 50%.

Numerous applications can benefit from the improved signaling provided by the system 300. For example, Machine-to-Machine (MTM) applications can use the signaling messages to better manage MT message submission to the wireless telecommunications system 7. The signaling messages may indicate that a mobile device 8 is registered and available on the cellular network 1, for example. The value of such signaling messages can diminish over time, especially for an MTM service mobile device as compared to a standard cellular mobile device used for cellular telephone service. The MTM device may have battery constraints and only power up occasionally and therefore not always be available. Additionally, cellular coverage may be lost as a device moves from one location to another.

In operation, the SMS messaging gateway 15 receives the MT result 18, as discussed above with reference to FIG. 2. When the MT result 18 is received, the SMS messaging gateway 15 inspects the MT result 18. If the result indicates a delivery failure for a registered customer application 3, a mobile device identifier for the associated end mobile device 8 is added to a registration database 22. Mobile management messages 13 can be constantly streamed to the HLR 14 independent of any other activity to register presence and location and to authenticate the end mobile devices 8. The HLR 14 may stream the mobile management messages 21 via Extensible Markup Language (XML) or other appropriate protocol to the SMS messaging gateway 15. The SMS messaging gateway 15 inspects the mobile identification for each of the mobile management messages 21 received from the HLR 14. Via this inspection, the SMS messaging gateway 15 compares the received messages 21 with mobile identifications associated with the customer application 3 that were previously stored in the registration database 22. (See inquiry 77.) If the SMS messaging gateway 15 matches a mobile identification received from the HLR 14 with a record of the registration database 22, then a unit ready notification message 23 is sent to the customer application 3. (See right "yes" branch from inquiry 77.) The response of the customer application 3 to receipt of a unit ready notification message 23 can be application dependent. One potential response is that the customer application 3 may use the unit ready notification message 23 to reattempt a previous failed MT 11 message by retrieval from a failed MT queue 78. If the mobile identification is found in the registration database 22, then the record is removed from the registration database 22. (See upper "yes" branch from inquiry 77.) If the mobile identification received from the HLR 14 does not match a registration record of database 22, then the next mobile management message 21 is retrieved.

Accordingly and in accordance with some embodiments, an exemplary SMS messaging gateway can comprise a first communication interface for a first communication link to a Home Location Registry (HLR) for a cellular network (or for a link to another appropriate system associated with the cellular network); a second communication interface for a second communication link to a SS7 network for the cellular network; a third communication interface for a third communication link to a short message service center for the SS7 network; and a fourth communication interface to an external customer network. Instructions stored in a memory storage device and executable by a computer, can determine if a mobile device is registered based on a mobile message received via the first communication interface. If the mobile device is determined to be registered, the computer can send a unit-ready notification over the fourth communication interface.

Turning now to FIGS. 4, 5, and 6, some representative embodiments that utilize a RADIUS server and associated feed will be discussed in further detail.

As will be appreciated by those skilled in the art having benefit of this disclosure, "RADIUS" is short for Remote Authentication Dial-In Service and generally refers to a client/server networking protocol that supports centralized authentication, authorization, and accounting (AAA) for users connecting to/using a network service. The Internet Engineering Task Force (IEIF) typically maintains a set of specifications underlying RADIUS. A RADIUS server is generally a server that implements RADIUS or RADIUS-based protocols.

Referring now to FIG. 4, this figure illustrates a functional block diagram of a system 400 providing an example operating environment for an embodiment of the technology. The system 400 illustrated in FIG. 4 generally parallels the system 100 illustrated in FIG. 1 and discussed above, with many common elements and capabilities, but with different cellular signaling infrastructure.

More specifically, the cellular network 401 of the system 400 utilizes a RADIUS server 414 in place of the home location register 14 of FIG. 1. The RADIUS server 414 of the cellular network 401 connects to an associated Gateway GPRS (general packet radio service) Support Node (GGSN) 411. The GGSN 411 can support communication with external packet switched networks. The GGSN 411 and the wireless telecommunications system 7 are linked together so that data 412 from the wireless telecommunications system 7 transmits to the GGSN 411. Similarly, the GGSN 411 and the RADIUS server 414 are linked together so that accounting data 412 from the GGSN 411 transmits to the RADIUS server 414.

Referring now to FIG. 5, this figure illustrates a functional block diagram of another system 500 providing another example operating environment for an embodiment of the technology. An example digital gateway, specifically a computer-based SMS Messaging Gateway 15, is located between the cellular network 401 and the external customer network 2 that comprises a customer application 3.

The system 500 illustrated in FIG. 5 generally parallels the system 200 illustrated in FIG. 2 and discussed above, with many common elements and capabilities, but with different cellular signaling infrastructure. As discussed above with reference to FIG. 4, the cellular network 401 illustrated in FIGS. 4 and 5 comprises a RADIUS server 414 and associated GGSN 411. The SMS Messaging Gateway 15 connects to the RADIUS server 414 via a RADIUS accounting feed 521. The RADIUS accounting feed 521 carries RADIUS accounting data 522 to the SMS Messaging Gateway 15 to provide operating information about the cellular network 401, for example signaling information and messages that may relate to individual end mobile devices 8. The RADIUS accounting data 522 can be associated with or derived from the data 412 transmitting between the wireless telecommunications system 7 and the GGSN 411 and/or the accounting data 413 transmitting between the GGSN 411 and the RADIUS server 414.

Referring now to FIG. 6, this figure illustrates a functional block diagram of an example system 600 in which the system 500 illustrated in FIG. 5 has been enhanced to provide real-time RADIUS accounting data 522 for use by customer applications 3 on the external customer network 2 in accordance with some embodiments of the technology.

The system 600 illustrated in FIG. 6 can be viewed as overlaying an improved signaling technology or process upon the system 500 illustrated in FIG. 5 and upon the associated processes as discussed above.

With the RADIUS accounting feed 521 from the RADIUS server 414, RADIUS accounting data 522 can be delivered to the customer application 3 immediately upon receipt from the RADIUS server 414, for example within approximately one second.

Numerous applications can benefit from the improved signaling provided by the system 600. For example, Machine-to-Machine (MTM) applications can use the RADIUS accounting data 522 to better manage communication and interaction with the wireless telecommunications system 7. A determination can be efficiently made about whether a particular mobile device 8 is registered and available on the cellular network 401, for example. As discussed above with reference to FIG. 3, logic and processes executing on the SMS Messaging Gateway 15 can further enhance engagement and operation of the customer application 3, for example.

Accordingly and in accordance with some embodiments, an example SMS messaging gateway can comprise a first communication interface for a first communication link to a RADIUS server for a cellular network (or for a link to another appropriate system associated with the cellular network); a second communication interface for a second communication link to an SS7 network for the cellular network; a third communication interface for a third communication link to a short message service center for the SS7 network; and a fourth communication interface to an external customer network. Instructions stored in a memory storage device and executable by a computer, can determine if a mobile device is registered based on RADIUS accounting data received via the first communication interface. If the mobile device is determined to be registered, the computer can send a unit-ready notification over the fourth communication interface. A customer application can act on or be prompted by information sent over the fourth communication interface.

Many modifications and other embodiments of the disclosures set forth herein will come to mind to one skilled in the art to which these disclosures pertain who has the benefit of the teachings presented in the foregoing descriptions and the associated drawings. Therefore, it is to be understood that the disclosures are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A method comprising the steps of:
    by a digital gateway, maintaining a database that associates mobile devices with a customer application, wherein the digital gateway comprises:
        a first communication interface for a first communication link to a RADIUS (Remote Authentication Dial-In Service) server for a cellular network;
        a second communication interface for a second communication link to a signaling system 7 (SS7) network for the cellular network;
        a third communication interface for a third communication link to a short message service center (SMSC) for the SS7 network; and
        a fourth communication interface for a fourth communication link to an external customer network,
    wherein the customer application resides on the external customer network;
    by the digital gateway, receiving a plurality of RADIUS accounting messages from the RADIUS server via the first communication interface, the RADIUS accounting messages comprising real-time accounting data;
    by the digital gateway, comparing a RADIUS accounting message from the plurality of RADIUS accounting messages with the database to determine whether the RADIUS accounting message is associated with one of the mobile devices; and
    by the digital gateway, if the RADIUS accounting message is determined to be associated with the one of the mobile devices, sending notification to the customer application via the fourth communication interface that the one of the mobile devices is available,
    wherein the step of sending notification to the customer application comprises translating the RADIUS accounting message into a format compatible with the customer application, wherein the RADIUS accounting message has a protocol that is incompatible with the customer application and the translated RADIUS accounting message has a protocol that is compatible with the customer application.

2. The method of claim 1, wherein the digital gateway comprises an SMS (short message service) messaging gateway.

3. The method of claim 1, wherein the digital gateway receives the plurality of RADIUS accounting messages as a stream, in a continuous and managed process in which the digital gateway processes RADIUS accounting messages of the stream while other RADIUS accounting messages of the stream are being received.

4. The method of claim 1, wherein the customer application comprises a machine-to-machine application.

5. The method of claim 1, further comprising the step of by the digital gateway, if the RADIUS accounting message is determined to be associated with the one of the mobile devices, updating the database.

6. The method of claim 1, wherein the translated RADIUS accounting message comprises an application notification message.

7. The method of claim 1, wherein the digital gateway comprises a messaging gateway that connects a plurality of external customer networks to at least one cellular network.

8. The method of claim 1, further comprising the step of by the gateway, receiving SMS mobile terminate (SMS MT) results via SS7 (signaling system 7).

9. The method of claim 1, further comprising the step of by the gateway, receiving SMS MT (short message service mobile terminate) results from the SMSC via the third communication interface.

10. The method of claim 1, further comprising the steps of:
    by the gateway, receiving SMS MT results via SS7; and
    by the gateway, receiving SMS MT results from the SMSC.

11. The method of claim 1, wherein the step of receiving the plurality of RADIUS accounting messages comprises receiving the plurality of RADIUS accounting messages from the RADIUS server over a RADIUS accounting feed that comprises connectivity between the RADIUS server and the digital gateway.

12. The method of claim 11, wherein the step of sending notification to the customer application comprises delivering the real-time accounting data to the customer application immediately upon receipt from the RADIUS server.

13. The method of claim 12, wherein delivering the real-time accounting data to the customer application immediately upon receipt from the RADIUS server comprises delivering the real-time accounting data to the customer application within approximately one second of receipt from the RADIUS server.

14. A method comprising:
monitoring a RADIUS accounting feed and receiving at a gateway a RADIUS accounting message having a first protocol that is incompatible with an application residing on a customer network;
receiving a delivery result of a SMS MT message submitted by the application at the gateway;
determining, at the gateway, whether the received SMS MT result indicates a delivery failure for the application's SMS MT message;
if the delivery failure is indicated, then including in a registration database at the gateway a mobile device identifier that is associated with the SMS MT result;
determining, at the gateway, whether the received RADIUS accounting message is associated with a mobile device; and
if the received RADIUS accounting message is determined to be associated with the mobile device, then translating the RADIUS accounting message into an application notification message having a second protocol that is compatible with the application and sending notification to the application that the mobile device is available.

15. The method of claim 14, wherein the gateway comprises an SMS messaging gateway.

16. The method of claim 14, wherein the application comprises a registered customer application.

17. The method of claim 14, wherein the gateway provides an interface between one or more cellular networks and one or more external customer networks.

18. The method of claim 14, wherein monitoring the RADIUS accounting feed at the gateway comprises monitoring real-time RADIUS accounting messages at the gateway.

19. The method of claim 18, wherein the real-time RADIUS accounting messages are received at the gateway as a stream, in a continuous and managed process in which the gateway processes RADIUS accounting messages of the stream while other RADIUS accounting messages of the stream are being received.

20. An SMS messaging gateway comprising:
a first communication interface for a first communication link to a RADIUS server for a cellular network, the first communication interface operative to receive a stream of RADIUS accounting messages from the RADIUS server and to inspect each RADIUS accounting message in the stream in real time, the stream providing a continuous and managed process for processing RADIUS accounting messages of the stream while other RADIUS accounting messages of the stream are being received;
a second communication interface for a second communication link to an SS7 network for the cellular network;
a third communication interface for a third communication link to a short message service center for the SS7 network;
a fourth communication interface for a fourth communication link to an external customer network; and
computer-executable instructions stored in a memory storage device for:
determining whether a RADIUS accounting message from the stream of RADIUS accounting messages is associated with a mobile device, wherein the RADIUS accounting message has a first protocol that is incompatible with a customer application residing on the external customer network; and
if the RADIUS accounting message is determined to be associated with the mobile device, then translating the RADIUS accounting message to a format having a second protocol that is compatible with the customer application and sending notification to the customer application via the fourth communication interface that the mobile device is available.

21. The SMS messaging gateway of claim 20, further comprising a registration database.

22. The SMS messaging gateway of claim 20,
wherein the SMS messaging gateway further comprises a database, and
wherein the computer-executable instructions further comprise instructions for updating data of the database if the mobile device is determined to be registered.

23. The SMS messaging gateway of claim 20, wherein the stream of RADIUS accounting messages comprises real-time accounting data.

* * * * *